United States Patent [19]

Matsuda et al.

[11] Patent Number: 5,000,522
[45] Date of Patent: Mar. 19, 1991

[54] ANTI-LOCK BRAKE CONTROL METHOD FOR VEHICLE

[75] Inventors: Shohei Matsuda; Tetsuro Hamada; Makoto Sato, all of Wako, Japan

[73] Assignee: Honda Giken Kogyo Kabushiki Kaisha, Japan

[21] Appl. No.: 286,014

[22] Filed: Dec. 19, 1988

[30] Foreign Application Priority Data

Dec. 22, 1987 [JP] Japan .................................. 62-325070

[51] Int. Cl.⁵ ............................................... B60T 8/32
[52] U.S. Cl. ..................................... 303/100; 180/197; 180/248; 188/181 C
[58] Field of Search .................... 303/91, 93, 94–111, 303/112, 113–119; 188/181 C; 180/233, 247, 248, 244, 245, 246, 249, 250, 197; 364/426.02

[56] References Cited

U.S. PATENT DOCUMENTS

| | | | |
|---|---|---|---|
| 3,909,070 | 9/1975 | Leiber | 188/181 C X |
| 3,929,382 | 12/1975 | McNinch, Jr. et al. | 303/96 X |
| 4,576,419 | 3/1986 | Leiber | 303/96 X |
| 4,668,022 | 5/1987 | Sato | 303/100 |
| 4,735,279 | 4/1988 | Sato | 180/248 |
| 4,746,173 | 5/1988 | Fennel et al. | 180/248 X |

*Primary Examiner*—Douglas C. Butler

[57] ABSTRACT

In a vehicle having a pair of left and right coaxially disposed wheels operatively coupled together via a differential gear which serves to restrict an increase in the difference in rotational speed between the wheels, a method to carry out anti-lock control of both the wheels concurrently during braking operation by utilizing a higher one of the wheel speeds thereof. This enhances braking efficiency and only one control channel is required for the wheels.

1 Claim, 3 Drawing Sheets

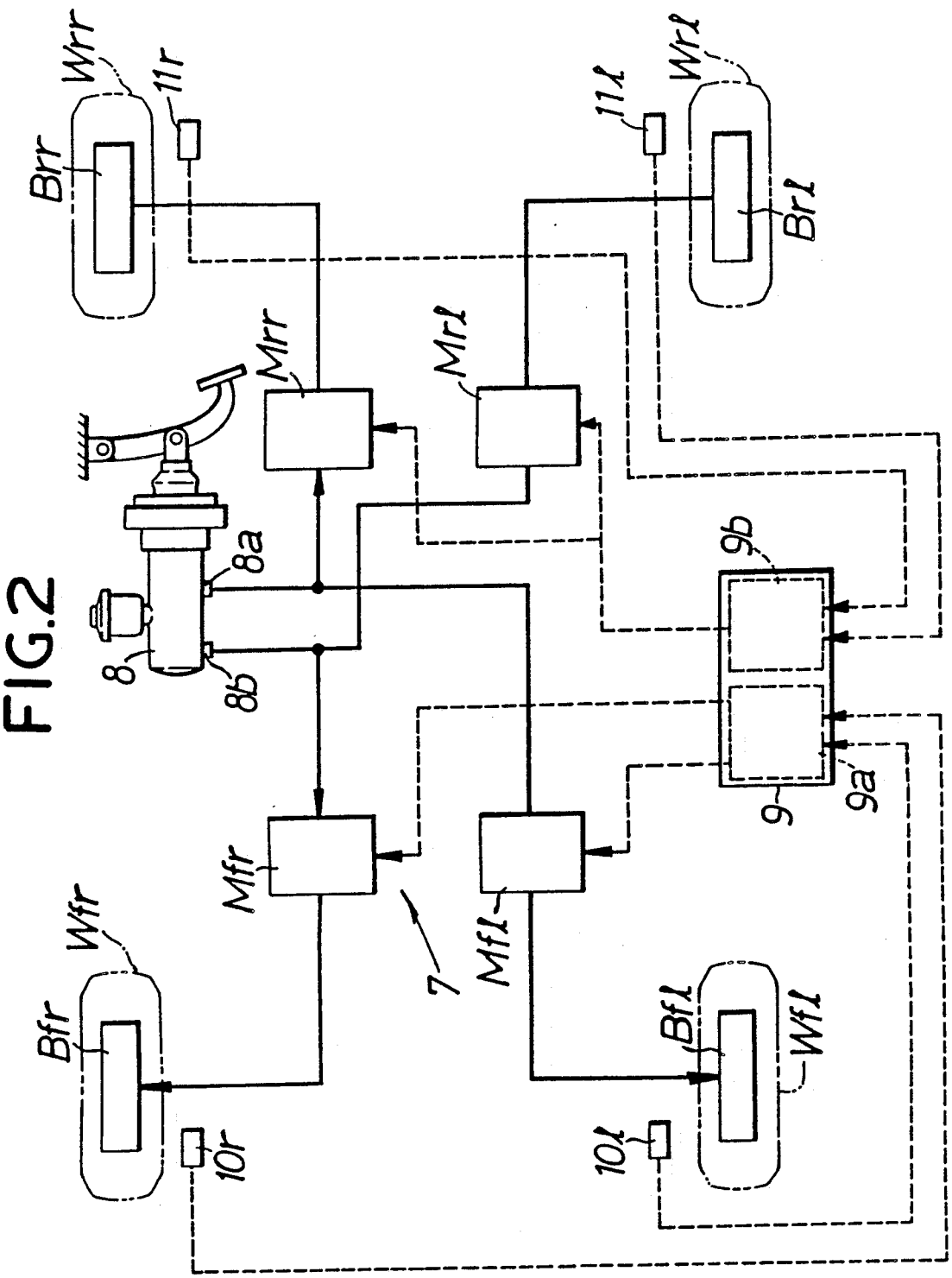

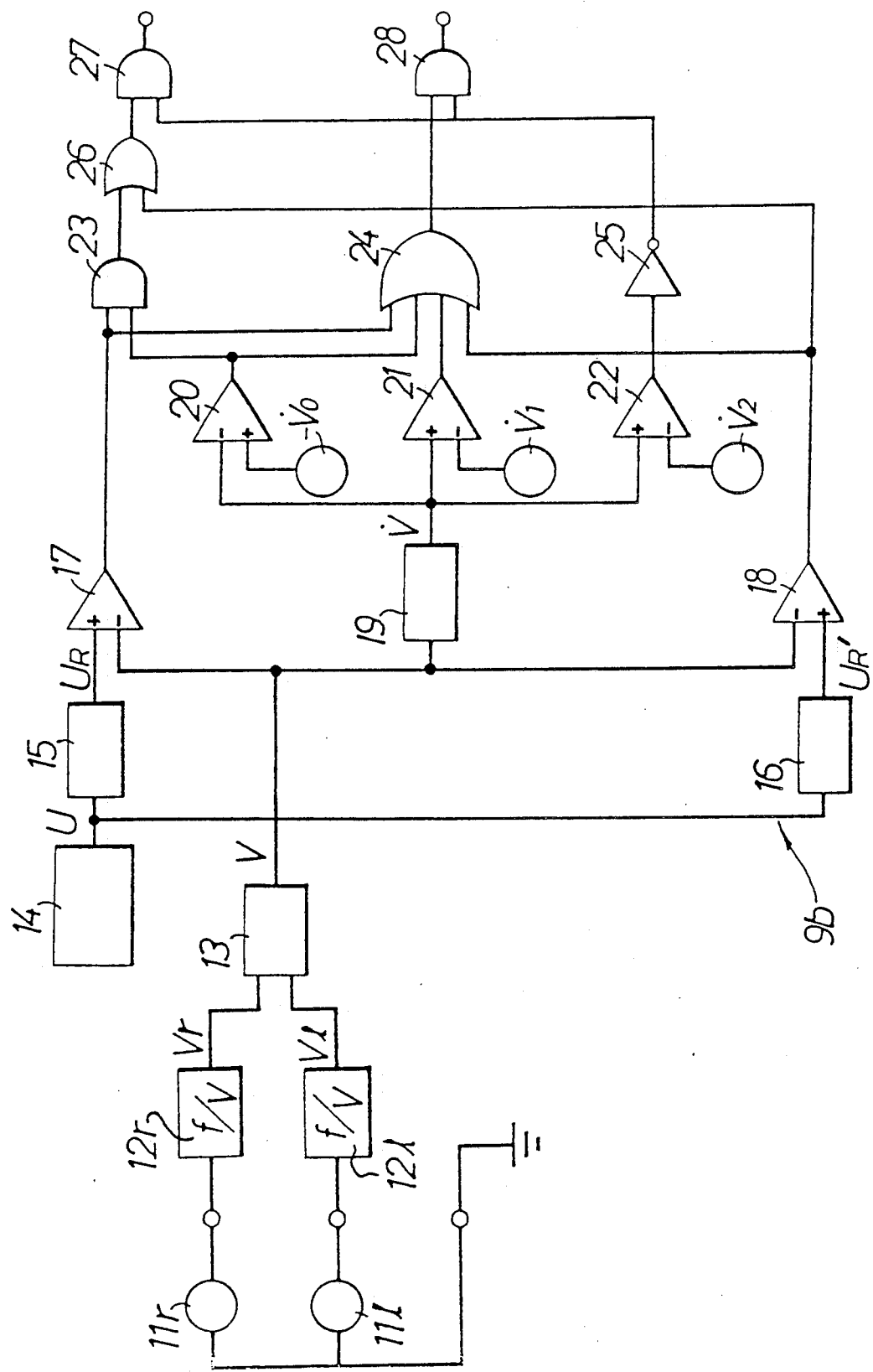

ANTI-LOCK BRAKE CONTROL METHOD FOR VEHICLE

BACKGROUND OF THE INVENTION

1. Field of the Invention

The present invention relates to an anti-lock control method applicable to a vehicle which has a pair of left and right wheels connected together via a differential gear having a differential limiting function.

2. Description of the Prior Art

When rear wheels of a four wheel-drive vehicle or a rear wheel-drive vehicle, which wheels are coupled together via a differential gear, are subjected to anti-lock control operation, it is conventional to employ a system of controlling the braking forces to the rear wheels independently from each other or a low-select system permitting the braking forces to both the wheels to be reduced concurrently in response to a locking tendency appearing at one of the wheels which is rotating at a lower speed.

In case the left and right rear wheels are connected to each other via a differential gear having a differential limiting function, however, employment of the above anti-lock control systems would cause the following problems. That is, in the low-select system, when brake force is applied to both the left and right wheels which are travelling on road surfaces of different coefficients of friction, the tackiness of that wheel which is on the road surface having a higher coefficient of friction may be utilized only to a non-neglectably reduced extent, leading to lowering of the braking efficiency. This is particularly remarkable in a rear wheel-drive vehicle having a larger part of its load distribution placed on the rear wheels. On the other hand, the system applying anti-lock control to left and right wheels independently from each other requires two control channels, which is not desirable in respect of cost, weight and required space.

SUMMARY OF THE INVENTION

The present invention has been proposed in view of the above circumstances and its object is to provide an anti-lock control method for a vehicle which permits the tackiness of that wheel which is travelling on the road surface of higher friction coefficient to be utilized sufficiently, thereby improving the braking efficiency while reducing cost, weight and space required for mounting associated components as compared with conventional arrangements.

According to the invention, anti-lock control is effected so as to concurrently weaken the brake forces to both wheels when one of the wheels having a higher wheel speed than the other is entering a locked condition.

Regardless of the fact that at the time of braking operation the wheel on the road surface having a lower friction coefficient tends to be locked and its wheel speed is liable to go down more than the other wheel, the differential gear having a differential limiting function enables the driving force to be transmitted to said wheel from the side of the other wheel travelling on the road surface of higher coefficient of friction. This makes it difficult to allow the wheel on the road surface of lower friction coefficient to enter a locked condition. Accordingly, the proposed method to reduce the brake force applied to both the wheels when the wheel rotating at a higher speed is coming into a locked state can suppress lowering in the braking stability. The braking efficiency can be enhanced by utilizing the tackiness of that wheel which is at that time travelling on the road surface of higher coefficient of friction. Only one channel will be sufficient for carrying out the anti-lock control method according to the invention, leading to a reduction in cost, weight and required space.

BRIEF DESCRIPTION OF THE DRAWINGS

The accompanying drawings show one embodiment according to the invention, wherein FIG. 2 is a circuit diagram showing brake hydraulic pressure lines, and FIG. 3 is a block diagram showing the arrangement of a rear wheel control section in an anti-lock control system.

DESCRIPTION OF PREFERRED EMBODIMENT

Figure 1:
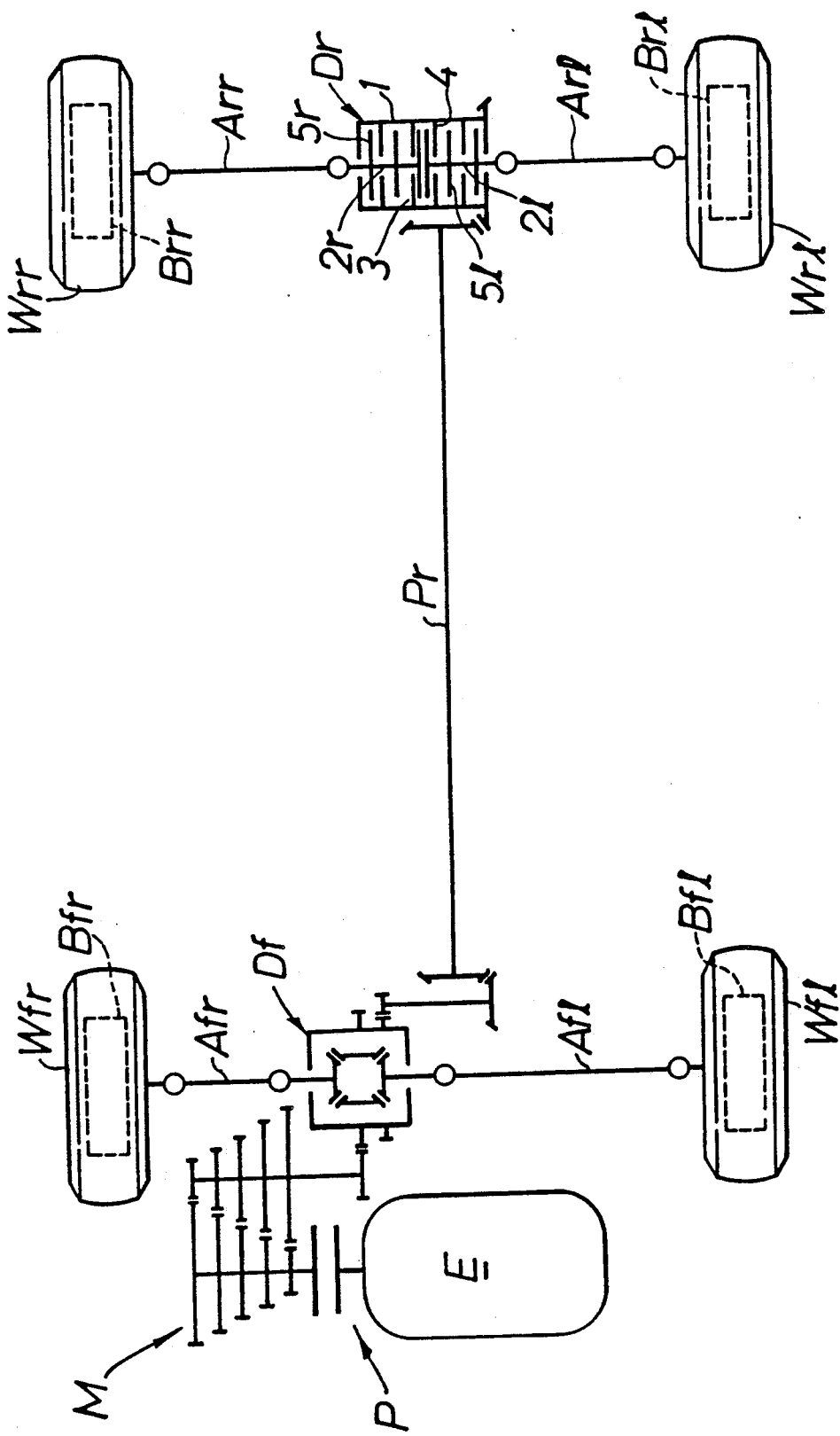
FIG. 1 is a diagrammatical view showing a drive system.

One embodiment according to the invention will be described hereinafter with reference to the accompanying drawings. Referring first to FIG. 1, a pair of left and right front wheels Wfl and Wfr and a pair of left and right rear wheels Wrl and Wrr are suspended on front and rear parts of a vehicle body, not shown, respectively.

A pair of left and right front axles Afl and Afr lead to the respective left and right front wheels Wfl and Wfr and are connected together via a front differential gear Df. The front differential gear Df has its input portion connected with a power unit P which is mounted on the front part of the vehicle body in this embodiment and includes an engine E and a transmission M. A propeller shaft Pr is provided and connected at one of opposite ends thereof to the front differential gear Df, the other end of shaft Pr being connected to the input portion of a rear differential gear Dr. A pair of left and right rear axles Arl and Arr lead to the left and right wheels Wrl and Wrr, respectively, and these axles are connected together via the afore-mentioned rear differential gear Dr.

The rear differential gear Dr is constructed to have a differential limiting function, such as in the form of a viscous clutch, for example, and comprises an outer clutch member 1 connected to the propeller shaft Pr, a first inner clutch member 2l connected to one rear axle Arl, a second inner clutch member 2r connected to the other rear axle Arr, a plurality of outer clutch plates 4 spline-connected to the outer clutch member 1, a plurality of first inner clutch plates 5l spline-connected to the first inner clutch member 2l and a plurality of second inner clutch plates 5r spline-connected to the second inner clutch member 2r, the outer clutch plates 4 and the inner clutch plates 5l, 5r being interleaved with one another. A sealed oil chamber 3 is formed between the outer clutch member 1 and the first and second inner clutch members 2l and 2r, and a highly-viscous oil and a small quantity of air which permits the highly-viscous oil to thermally expand are sealed in the oil chamber 3. Respective clutch plates 4, 5l and 5r are provided with openings or grooves (not shown) which permit the oil to flow therethrough.

When a relative rotational force occurs between the outer and inner clutch members 1 and 2l, 2r in the differential gear Dr, the clutch plates 4 and 5l, 5r are rotated relative to each other as they shear the highly-viscous oil, and a viscous transmission of torque is effected between the clutch plates 4 and 5l, 5r. When the relative rotational speed increases, a complex temperature gradient occurs in the clutch plates 4 and 5l, 5r due to an increase in the temperature of the oil. Due to the multiplied effect of the strain in the clutch plates, which is caused by this temperature gradient, and an increase in the pressure in the sealed oil chamber 3, a frictionally contacting or extremely slightly separated condition occurs between adjacent clutch plates 4 and 5l, 5r, so that the frictional transmission of torque is effected between the outer and inner clutch members 1 and 2l, 2r.

By virtue of the rear differential gear Dr, the propeller shaft Pr and one rear wheel Wrl, and the shaft Pr and the other rear wheel Wrr are connected substantially rigidly at all times, and when a difference in rotational speed occurs between the left and right rear wheels Wrl and Wrr, the driving force is swiftly transmitted from the side of one wheel rotating at a higher speed to the side of the other wheel rotating at a lower speed.

Referring to FIG. 2, the front wheels Wfl, Wfr are provided with brakes Bfl, Bfr and the rear wheels Wrl, Wrr are provided with brakes Brl, Brr. A brake hydraulic pressure system 7 is provided for controlling the hydraulic pressures supplied to the brakes Bfl, Bfr, Brl and Brr. The system 7 comprises a tandem-type master cylinder 8 having a pair of output ports 8a, 8b, modulators Mfl and Mrr adapted to regulate the hydraulic pressure supplied from one output port 8a and feed resultant hydraulic pressures to the brake Bfl for left front wheel and the brake Brr for right rear wheel, and modulators Mfr and Mrl for regulating the hydraulic pressure supplied from the other output port 8b and feeding resultant hydraulic pressures to the brake Bfr for right front wheel and the brake Brl for left rear wheel. The brake hydraulic pressure system 7 is further equipped with an anti-lock control system 9 for controlling the operations of modulators Mfl, Mfr, Mrl and Mrr in order to prevent the wheels from entering a locked state.

The anti-lock control system 9 includes a front wheel control section 9a for separately controlling the modulators Mfl, Mfr for the brakes Bfl, Bfr associated with the front wheels Wfl, Wfr, and a rear wheel control section 9b for concurrently controlling the modulators Mrl, Mrr for the brakes Brl, Brr associated with the rear wheels Wrl, Wrr. Wheel speed detectors 10l, 10r are provided to detect the wheel speeds of the front wheels Wfl, Wfr. Signals from these detectors 10l, 10r are inputted to the front wheel control section 9a. Further wheel speed detectors 11l, 11r are provided to detect the wheel speeds of the rear wheels Wrl, Wrr and their signals are inputted to the rear wheel control section 9b.

The construction of the rear wheel control section 9b will next be described with reference to FIG. 3. The wheel speed detectors 11l, 11r output the wheel speed signals of values proportionate to the peripheral speeds of the wheels in the form of frequency signals. The frequency signals generated at the wheel speed detectors 11l, 11r are inputted to frequency-voltage converters 12l, 12r, respectively, at which the signals are converted into voltage signals proportionate to the wheel speeds Vl, Vr. Such wheel speed signals Vl, Vr are inputted to a high-select circuit 13 which selects a higher one of the wheel speeds Vl, Vr inputted thereto. The selected higher voltage signal is outputted as a signal indicative of the wheel speed V.

Vehicle speed U is estimated at a vehicle speed estimation circuit 14 on the basis of the wheel speed. A voltage signal corresponding to the estimated vehicle speed U is fed to a reference wheel speed setting circuit 15 as well as to a lower reference wheel speed setting circuit 16. The reference wheel speed setting circuit 15 is constructed as a crossover network to establish a wheel speed $U_R$ taking account of a predetermined slip rate $\lambda_0$ with respect to the estimated vehicle speed U. That is, in this circuit 15, the reference wheel speed $U_R$ having a relationship of $U_R=(1-\lambda_0)U$ is established. The lower reference wheel speed setting circuit 16 similarly operates to set a lower reference wheel speed $U_R'$ having a lower value than the reference wheel speed $U_R$.

The reference wheel speed $U_R$ is delivered to a non-inverted input terminal of a comparator 17 and the lower reference wheel speed $U_R'$ is delivered to a non-inverted input terminal of a comparator 18. The wheel speed V fed from the high-select circuit 13 is inputted to respective inverted input terminals of the comparators 17 and 18 and also to a differentiating circuit 19. The wheel speed V is differentiated in the circuit 19 thereby to obtain a wheel acceleration $\dot{V}$. The wheel acceleration $\dot{V}$ is fed to comparators 20, 21 and 22.

The comparator 20 compares the wheel acceleration $\dot{V}$ inputted thereto with a reference wheel deceleration $-\dot{V}_0$ representing a predetermined negative value of reference wheel acceleration and when $\dot{V}<-\dot{V}_0$, outputs a high level signal. The comparator 21 compares the wheel acceleration $\dot{V}$ with a previously established first reference wheel acceleration $\dot{V}_1$ and it outputs a signal of high level when $\dot{V}>\dot{V}_1$. Further at the comparator 22, a comparison is made between the wheel acceleration $\dot{V}$ and a predetermined second reference wheel acceleration $\dot{V}_2$ and when $\dot{V}>\dot{V}_2$ a high level signal is outputted therefrom. There is further set a relationship of $\dot{V}_1<\dot{V}_2$.

The output from comparator 20 is fed to one of input terminals of AND gate 23 and to OR gate 24 whereas the output from comparator 17 is fed to the other input terminal of AND gate 23 and to OR gate 24. The output of comparator 21 is supplied into OR gate 24. The output of comparator 22 is fed through an inversion circuit 25 to respective one input terminals of AND gates 27 and 28. The output of comparator 18 is fed to OR gate 24 and further to one input terminal of OR gate 26. Moreover, the output of AND gate 23 is fed to the other input terminal of OR gate 26 and the OR gate 26 outputs a signal which is supplied to the other input terminal of AND gate 27. The output of OR gate 24 is fed into the other input terminal of AND gate 28.

Outputs from the AND gates 27 and 28 are used to control anti-lock operations of both the modulators Mrl and Mrr. When both the AND gates 27 and 28 output low level signals, the modulators Mrl and Mrr are operated to generate brake hydraulic pressures in response to the brake actuating operation. When the output of AND gate 28 assumes a high level and the output of AND gate 27 assumes a low level, the modulators Mrl and Mrr are so operated to hold the brake hydraulic pressures constant at their current levels. When the outputs from both the AND gates 27 and 28 become high, the modulators Mrl and Mrr are operated to reduce the brake hydraulic pressures.

Owing to the above arrangement of the rear wheel control section 9b, when a faster one of the rear wheels Wrl and Wrr having respective wheel speeds Vl and Vr is going into a locked condition, the modulators Mrl and Mrr are actuated to concurrently carry out anti-lock operations.

The front wheel control section 9a comprises a part corresponding to the left front wheel Wfl and a part corresponding to the right front wheel Wfr and these parts are different from the construction of the rear wheel control section 9b in that the wheel speeds of respective front wheels Wfl and Wfr are separately inputted into the comparators 17 and 18 and differentiating circuit 19. The brake hydraulic pressures fed to the brakes Bfl, Bfr of front wheels Wfl, Wfr are, therefore, reduced independently from each other when the corresponding front wheels Wfl, Wfr are entering a locked condition.

The operation of this embodiment will next be described. Since the rear wheels Wrl and Wrr are coupled to the power unit P through the rear differential gear Dr having a differential limiting function, if a difference in the number of rotations between both the rear wheels Wrl and Wrr increases, the driving force is transmitted from one wheel rotating at a higher speed to the other wheel rotating at a lower speed. Due to this, in spite of the fact that one of the wheels which is travelling on a road surface of a lower coefficient of friction is liable to be locked and its wheel speed tends to be lowered more than the other wheel, the rear differential gear Dr works to transmit the driving force from the side of the wheel which is on the road surface having a higher coefficient of friction and therefore has a higher wheel speed, thus making it difficult to bring the wheel even on the road surface of lower coefficient of friction into a locked state. Accordingly, the arrangement that the brake forces to both the rear wheels Wrl, Wrr are reduced when a higher speed one of the wheels is coming into a locked state can suppress lowering of the braking stability and allow the tackiness of the wheel travelling on the road surface of a high friction coefficient to be utilized for enhancing the braking efficiency. Furthermore, the operations of the brakes Brl, Brr for rear wheels Wrl, Wrr can be controlled through one channel, which contributes to reduction in cost, weight and space.

In the above embodiment, the present invention has been applied to rear wheels of a four wheel-drive vehicle, however, it is applicable to front wheels when they are coupled together via a differential gear having a differential limiting function.

What is claimed is:

1. An anti-lock control method to improve braking of wheels of a four wheel drive vehicle which has a pair of coaxially disposed left and right wheels connected together via a differential gear having a differential limiting function when said wheels are traveling on road surfaces of different coefficients of friction, wherein said differential gear is a viscous clutch comprising an outer clutch member operatively connected to a shaft leading to a power unit, a pair of inner clutch member connected respectively to said left and right wheels, and a sealed oil chamber with a highly viscous oil sealed therein defined between said outer and inner clutch members, and further comprising a plurality of inner clutch plates connected to each of the inner clutch members and a plurality of outer clutch plates connected to the outer clutch member, said outer and inner clutch plates being interleaved with one another, said method comprising the steps of:
    (a) detecting wheel speeds of each of said left and right wheels;
    (b) selecting the higher one of said detected wheel speeds;
    (c) determining when the wheel of the selected speed is entering a locking condition; and
    (d) in response to such determination, concurrently reducing braking force applied to both said left and right wheels through a common control channel, such that tackiness of the wheel traveling on the road surface having a higher coefficient of friction is utilized to enhance braking efficiency, said method leading to a reduction in cost, weight and required space for said anti-lock braking control.

* * * * *